US012795764B1

(12) United States Patent
Livingston et al.

(10) Patent No.: US 12,795,764 B1
(45) Date of Patent: *Nov. 10, 2026

(54) MOBILE AD-HOC NETWORK DATA CONCURRENCY

(71) Applicant: Two Six Labs, LLC, Arlington, VA (US)

(72) Inventors: John A. Livingston, Oakton, VA (US); Michelle P. Cabahug, Washington, DC (US); Christopher Matthew Foster, Fairfax, VA (US)

(73) Assignee: Two Six Labs, LLC, Arlington, VA (US)

( * ) Notice: Subject to any disclaimer, the term of this patent is extended or adjusted under 35 U.S.C. 154(b) by 593 days.

This patent is subject to a terminal disclaimer.

(21) Appl. No.: 18/230,964

(22) Filed: Aug. 7, 2023

Related U.S. Application Data

(63) Continuation of application No. 17/956,063, filed on Sep. 29, 2022, now Pat. No. 11,723,101, which is a continuation of application No. 17/151,314, filed on Jan. 18, 2021, now Pat. No. 11,490,440.

(51) Int. Cl.

| | |
|---|---|
| ***H04W 24/00*** | (2009.01) |
| ***H04W 24/04*** | (2009.01) |
| ***H04W 24/08*** | (2009.01) |
| ***H04W 76/18*** | (2018.01) |
| *H04W 84/18* | (2009.01) |

(52) U.S. Cl.

CPC ........... *H04W 76/18* (2018.02); *H04W 24/04* (2013.01); *H04W 24/08* (2013.01); *H04W 84/18* (2013.01)

(58) Field of Classification Search

None

See application file for complete search history.

(56) References Cited

U.S. PATENT DOCUMENTS

| | | | | |
|---|---|---|---|---|
| 9,654,503 | B1 * | 5/2017 | Kowalyshyn | H04L 63/1425 |
| 2008/0026781 | A1 * | 1/2008 | Ho | H05B 47/22 455/507 |
| 2008/0294779 | A1 * | 11/2008 | Gkantsidis | H04L 67/06 709/226 |
| 2012/0033545 | A1 * | 2/2012 | Bejerano | H04L 45/48 370/221 |
| 2014/0213191 | A1 * | 7/2014 | Courtice | H04L 45/125 455/67.11 |
| 2017/0331685 | A1 * | 11/2017 | Fox | H04L 67/06 |
| 2022/0268467 | A1 * | 8/2022 | Ajamian | G05B 15/02 |
| 2024/0386273 | A1 * | 11/2024 | Tate | G06N 3/0495 |

* cited by examiner

*Primary Examiner* — Abdelilah Elmejjarmi

(74) *Attorney, Agent, or Firm* — Armis IP Law, LLC

(57) ABSTRACT

A mesh network of interconnected wireless nodes in which each node independently manages a wireless connection to one or more other wireless nodes for transporting data, and stochastically refreshes and maintains internode connections in the wireless mesh network. A network overlay orchestrator in each node periodically validates the connections to other nodes in the mesh network based on a current topology of connected nodes to ensure the efficiency of current connections. Connection logic replaces, if a connection validation fails, the failed connection with a newly established connection from a set of available neighbor nodes, and replaces, if none of the current connections fail validation, a stochastically selected connection with a newly established connection from the set of available neighbor nodes for promoting perturbation in the current internode connections.

20 Claims, 7 Drawing Sheets

To Fig. 6 Continued

MOBILE AD-HOC NETWORK DATA CONCURRENCY

RELATED APPLICATIONS

This application is a continuation of earlier filed U.S. patent application Ser. No. 17/956,063, filed Sep. 29, 2022, entitled "MOBILE AD-HOC NETWORK DATA CONCURRENTLY," now U.S. Pat. No. 11,723,101 which is a continuation of earlier filed U.S. patent application Ser. No. 17/151,314 entitled "MOBILE AD-HOC NETWORK DATA CONCURRENTLY," filed on Jan. 18, 2021, now U.S. Pat. No. 11,490,440, the entire teachings of which are incorporated herein by this reference.

STATEMENT REGARDING FEDERALLY SPONSORED RESEARCH AND DEVELOPMENT

This invention was made, at least in part, with government support under Contract No. HR011-17-C-0111. The Government has certain rights in the invention.

BACKGROUND

Mobile ad hoc networks (MANETs) based on wireless mesh protocols aim to provide connectivity to users without the requirements for existing infrastructure or prior network configuration. Such mesh networks employ a radio for providing the underlying network transport, and an end user device that may be a conventional end user computing device such as a smartphone or laptop, or a specialized device connected to a tactical radio. A number of radios in network proximity defines the mesh network operable for communications via the associated end user devices (EUDs).

SUMMARY

Communication architectures built on these MANETs typically follow one of two paradigms, either traditional client-server models that do not scale well on MANETs or purely peer-to-peer networks that do not provide data persistence. The method described herein creates and maintains a dynamic overlay network atop the MANET to enable efficient peer-to-peer communications using an algorithm, which incorporates information about the underlying MANET and knowledge of the efficiency of different routes in the MANET, to select specific edges in a content centric network (CCN) enabled network to maximize the efficiency and performance of the network without overloading the underlying MANET.

A network overlay orchestrator paired with a content centric networking agent deployed on end user devices in a mesh network achieves both scalability and data persistence by moderating the number and duration of connections between the nodes of the mesh network. An ad-hoc network such as a mesh network differs from networks that rely on fixed infrastructure such as WiFi access points and wired Ethernet, common in areas of widespread Internet connectivity. Each end user device employs a radio conversant in a mesh network protocol or medium for communication with other mesh network radios within range. Absence of a need for established infrastructure is particularly beneficial for tactical deployments in remote areas and/or for security separation from a widespread architecture. Each node in the mesh network maintains up to a specified number of connections to adjacent or proximate nodes, and a perturbation mechanism continually updates the connections to introduce a stochastic selection of nearby nodes, ensuring that a subset of nodes does not drift or become isolated or "orphaned" from the remaining nodes. In this manner, the stochastic connection management avoids a static separation of lesser used or more distal nodes as the mesh network tends to "drift" or move geographically.

Configurations here are based, in part, on the observation that mesh networks such as MANETs provide connectivity to users without the requirements for existing infrastructure or prior network configuration, allowing rapid deployment and independence. Unfortunately, conventional approaches to MANETs suffer from the shortcoming that they typically employ client-server models that do not scale well, or peer-to-peer networks that do not provide data persistence. Client-server arrangements can become overly connected when an excessive number of nodes are in range, generating excessive traffic that drastically limits the usability of the mesh network. Peer-to-peer association provides no guarantees that data propagates to all nodes in the network, particularly when some nodes may be disconnected from the mesh network due to physical distance, interference, or other factors.

Accordingly, configurations herein substantially overcome the above described shortcomings of conventional mesh and ad-hoc networks by creating and maintaining a dynamic overlay network atop the MANET to enable efficient peer-to-peer communications using connection logic which incorporates information about the underlying MANET and knowledge of the efficiency of different routes in the MANET. This overlay network is able to maximize the efficiency and performance of the underlying MANET as the number of nodes scales upwards. When combined with a content-centric networking implementation for propagation of information, this method provides a distributed communications system capable of maintaining information concurrency even on severely bandwidth limited networks, and in the absence of a centralized server.

In a mesh network of interconnected nodes as disclosed herein, each node independently establishes overlay network connections to one or more other nodes in order to transport data, information and other network traffic, collectively referred to as content, over the ad-hoc network infrastructure provided by radios conversant in the mesh network transport protocol. Each node includes a mesh radio and a user device (though the radio may be embedded on the user device such as a WiFi enabled laptop), and establishes connections to other nodes up to a predetermined maximum number based on a connectivity degree. The connectivity degree defines a number of connections that provide a balance between an overconnected network (a common problem in a client-server topology), and increased latency due to a lack of node connections. Each node periodically evaluates each of its established connections for viability to efficiently transport content between the connected nodes over the established connections. As a result of this evaluation, each node removes any of the established connections that are evaluated as nonviable and attempts to add new connections up to a predetermined maximum number according to an efficiency metric.

During each iterative evaluation, if none of the established connections evaluates as nonviable, the maximum number of connections has already been established, and at least one viable new connection can be made according to the efficiency metric, the node stochastically selects an established connection for deletion and adds a new connection based on the available nodes within range. This introduces a degree of perturbation for ensuring that connections avoid falling into a static state of dormancy leading to possible groups of "orphaned" nodes with no connections to the wider mesh network outside the isolated group.

In further detail, in an example configuration as depicted herein, in a mesh network of interconnected wireless nodes, each node executes a network overlay orchestration application that establishes an overlay network connection to one or more nodes for transporting data. The network overlay orchestration application establishes connections up to a predetermined number of nodes based on a connectivity degree, such that the connectivity degree defines a maximum number of connections that each mesh node attempts to establish. Generally these connections are unidirectionally outbound and need not be reciprocal. The network overlay orchestration application on each node periodically evaluates each of the established connections for viability to efficiently transport data between the connected nodes. For any of the established connections that are evaluated as nonviable, the network overlay orchestration application establishes new connections according to an efficiency metric, thus removing nodes that are nonperforming due to physical distance, interference, or other factors. However, if none of the established connections evaluates as nonviable, the network overlay orchestration application nonetheless forces a deletion of an established connection and adds a new connection based on the efficiency metric or other perturbation mechanism to provide a level of network entropy, which mitigates the chances of stale connections and orphaned nodes.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example mesh network is depicted for illustrating the data persistence and peer-to-peer connectivity of the disclosed approach. Any suitable mesh network deployment may be utilized, such that the mesh network includes a plurality of interconnected radios for wireless communication among the nodes of the network. Each node includes a radio and an end user computing device, either as an integrated arrangement or in a connected peripheral arrangement such that a computing device invokes the mesh radio through a USB or similar external connector. Each of the computing devices has a user interface, storage and a processor. Programs or applications (apps) running on the EUD generate and receive information such as documents, messages, emails, media and the like that are routinely circulated (sent and received) by such devices when connected to in an infrastructure network such as the Internet.

Figure 1:
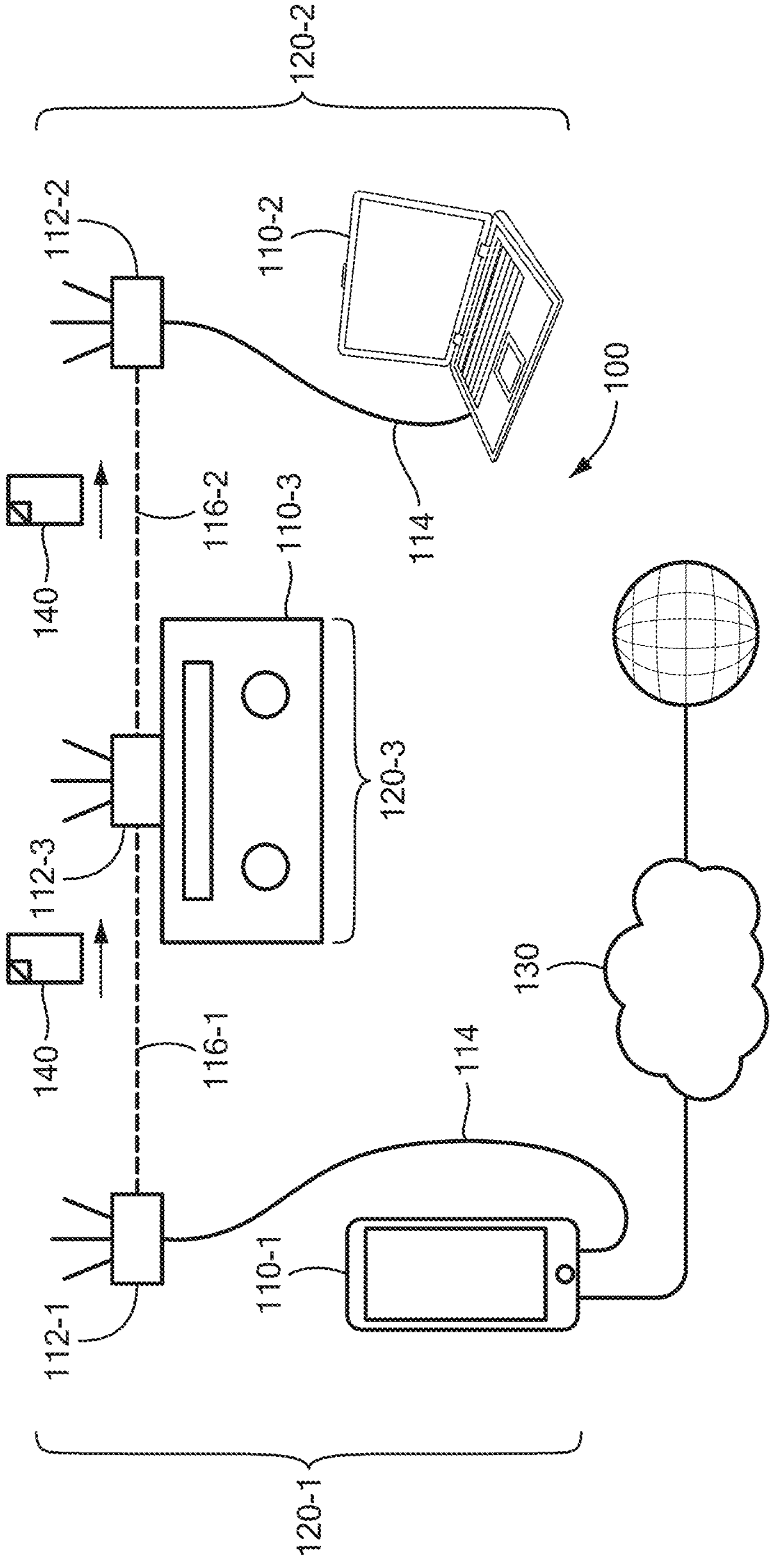
FIG. 1 is a context diagram of a mesh network environment suitable for use with configurations herein.

FIG. 1 is a context diagram of a mesh network environment 100 suitable for use with configurations herein. Referring to FIG. 1, the mesh network 100 includes EUDs such as smartphone devices 110-1, laptops 110-2 and tablets, and dedicated communication devices such as tactical radios with integrated user interfaces 110-3 (all 110 generally). In each device, a corresponding radio 112-1 . . . 112-3 (112 generally) performs network transport via wireless radio signals 116-1 . . . 116-2. The radios 112 may be integrated into the device, as in the tactical radio 110-3, or may be a separate device connected via a tether 114 such as a USB cord, ethernet cable or other suitable cable. Each device 110 and connected radio 112 collectively define a node 120-1 . . . 120-3 (120 generally) of the mesh network 100. In contrast to conventional infrastructure-based networks, the transport medium between the nodes 120 is the interconnections between the radios, rather than an established, permanent arrangement of physical lines and towers common in more developed areas. The mesh network 100 may operate on any suitable protocol such as proprietary mesh radio protocols or standardized implementations like ZIGBEE®, BLUETOOTH® and other standards under IEEE 802.11 and IEEE 802.15.4 for example. The approach disclosed herein is generally agnostic to the underlying medium employed by the radios 112, as all the radios in the mesh network are operable according to the protocol selected for any particular use case.

While the EUDs 110 may also be conversant for communication over public access networks such as the Internet 130, the infrastructure of mesh network 100 relies on the topology of the radios 112, and is independent of conventional network infrastructure such as WiFi access points and wired Ethernet connections that define the network infrastructure in most developed areas for Internet connectivity. In other words, it operates on dedicated mobile radios, rather than a mostly fixed arrangement of Internet routers. The mesh network 100 therefore relies on a purely wireless medium that depends on the proximity of the radios 112, rather than an established wired and wireless telecommunications network. While some of the nodes 120 may be generally stationary or static, a mesh network is particularly beneficial for the portability and dynamic topography afforded by mobile nodes 120 and the independence from a wired infrastructure. Bandwidth conservation and efficiency is therefore paramount.

Mobile ad hoc networks (MANETs) such as the mesh network 100 based on wireless mesh protocols aim to provide connectivity to users without the requirements for existing infrastructure or prior network configuration. Communication architectures built on these MANETs typically follow one of two paradigms: use of traditional client-server models that do not scale well on MANETs or purely peer-to-peer networks that do not provide data persistence. Configurations herein address the gap in efficient data persistence by incorporating a dynamic overlay that enables efficient routing of content across the MANET. Content Centric Networking (CCN) describes a network architecture or infrastructure for providing data persistence, which ensures that information content remains consistent across the network and is not vulnerable to network continuity issues that would cause, for example, a document or message 140 to be only propagated to a subset of the network. Conventional approaches do not provide a system and method that integrates a feedback mechanism between CCN implementations and the underlying MANET.

The network overlay orchestrator disclosed herein creates and maintains a dynamic overlay network atop the MANET to enable efficient peer-to-peer communications using an algorithm and method, which incorporates information about the underlying MANET and knowledge of the efficiency of different routes in the MANET. This allows the MANET to select specific edges in a CCN overlay to maximize the efficiency and performance of the network without overloading the underlying MANET. When combined with a content-centric networking implementation, this method provides a distributed communications system capable of maintaining information concurrency on severely bandwidth limited networks, even in the absence of connectivity to a centralized server.

Figure 2:
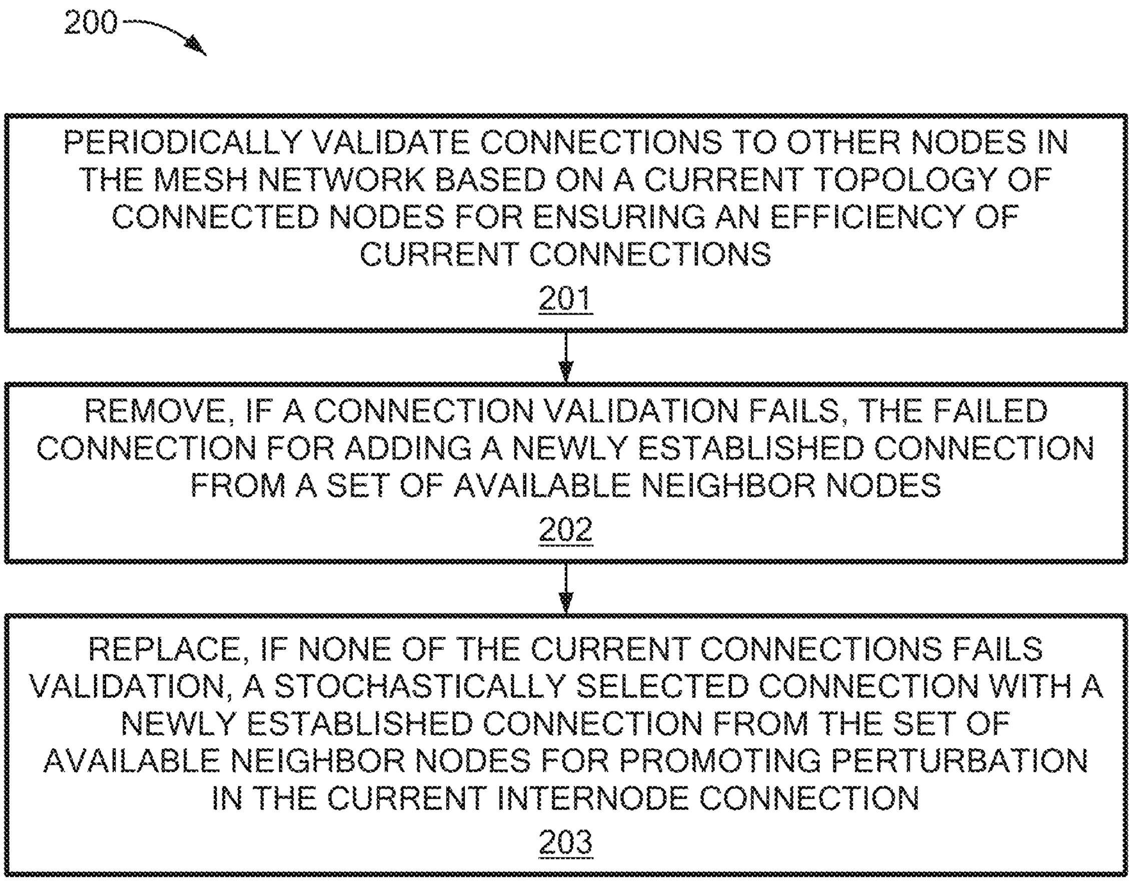
FIG. 2 is a high level flowchart of managing the stochastic overlay connections in the environment of FIG. 1.

FIG. 2 is a high level flowchart of managing the stochastic overlay connections in the environment of FIG. 1. Referring to FIGS. 1 and 2, in the mesh network 100, the disclosed method for stochastically refreshing and maintaining internode connections in a wireless mesh network includes periodically validating connections to other nodes in the mesh network based on a current topology of connected nodes for ensuring an efficiency of current connections. Unlike client-server networks which establish connections from all nodes to a central server, mesh networks maintain peer-to-peer connections to other nodes. Unlike conventional peer-to-peer networks which may try to connect to all nodes they can reach, the nodes 120 in the mesh network 100 establish a limited number of connections and refresh these connections according to connection logic in the network overlay orchestrator.

At each interval, the node 120 replaces, if a connection validation fails, the failed connection, with a newly established connection from a set of available neighbor nodes. Thus, the existing connections are evaluated to ensure they are still viable, and replaced with stronger connections to other mesh network nodes 120 if a connection has failed, likely because the distal node has moved out of range. If, however, none of the current connections fails validation, the node 120 replaces a stochastically selected connection with a newly established connection from the set of available neighbor nodes in order to promote perturbation in the current internode connections. Forced or quasi-random deletion of nodes prevents staleness in node configurations that persist too long in a mostly dynamic topology, and prevents nodes from "drifting" excessively far and at risk of becoming orphaned. In the case of nodes that are on a fringe of connectivity or viability, for example, the periodic evaluation may still indicate viability even though other nodes may be capable of equal or slightly greater connection efficiency. Such stochastic deletion of existing but possibly marginal connections provides network perturbation for refreshing node connectivity to avoid orphaning nodes that are viable, or within an effective range, but are continually slightly outpaced by other, closer nodes to the evaluating node.

Figure 3:
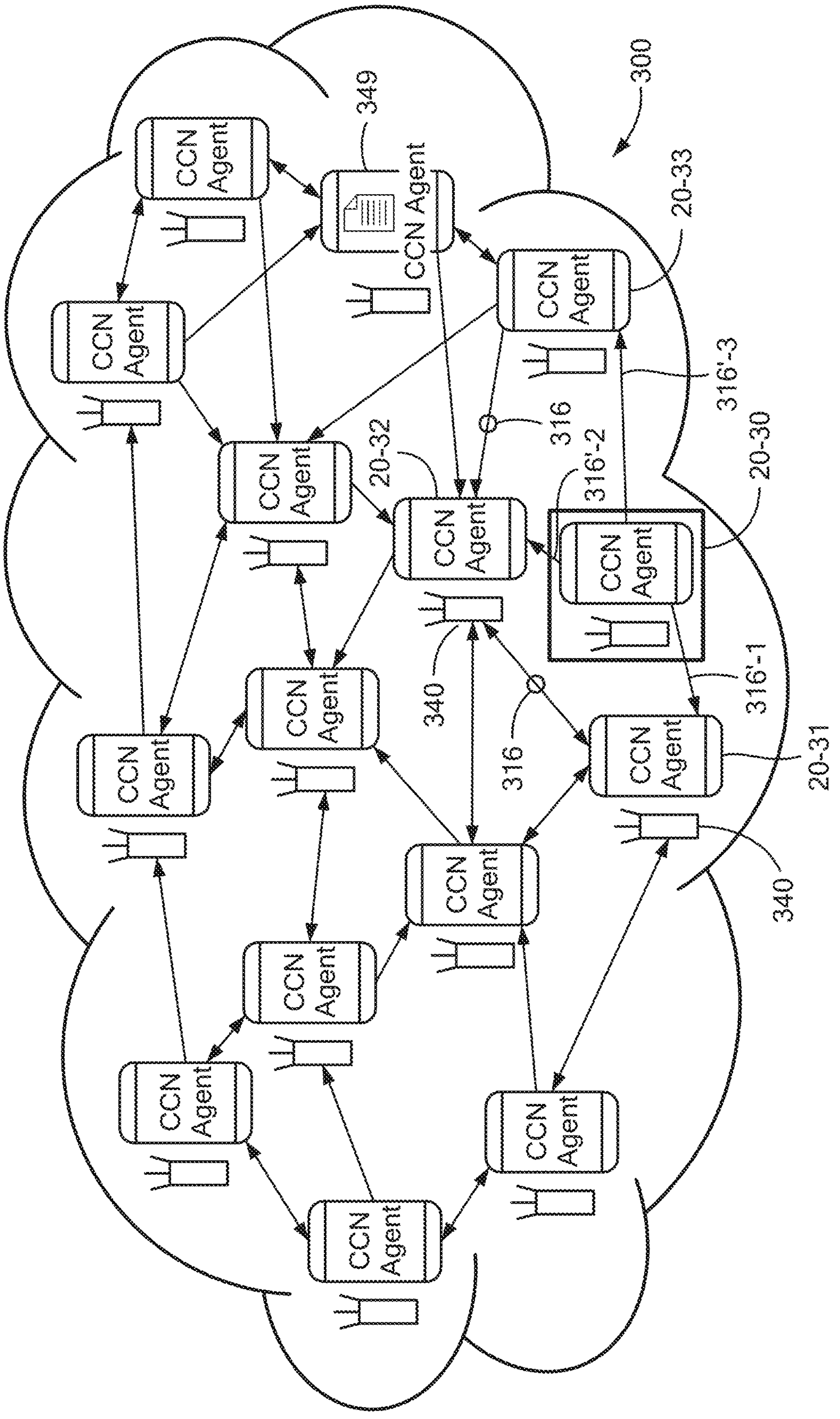
FIG. 3 shows a particular configuration of a mesh network having a late-joiner node that becomes orphaned in a naïve implementation.

FIG. 3 shows a particular configuration of a mesh network having a three-neighbor connection management approach which attempts to balance the shortcomings of a single centrally connected server, or a mesh arrangement seeking all available neighbors within range. Each node seeks three neighbors based on the most efficient connections, which operates well with a number of quorum nodes. However, certain circumstances may result in a late-joiner node that becomes orphaned. In contrast, conventional approaches include mesh networks without a CCN overlay for data persistence, and client server architectures which establish connections from all nodes to a central server. In one scenario, even a fully connected mesh network may later experience a fracture into two or more subnetworks due to node movement, for example. A document, message or transmission made in one of the fractured subnetworks will not later propagate to the other fractured subnetwork, even if the network is later rejoined. A central server may mitigate this, however it imposes large overhead network traffic as the node count rises. In an example configuration, content preservation approaches implement a peer-to-peer mechanism which limits overhead by capping a number of connections, and initiating connections to propagate content to indirect or later joining nodes. However, referring to FIG. 3, a plurality of nodes 20-N including nodes 20-31 . . . 20-33 are connected via connections 316 in a mesh network 300. Nodes 20-31 . . . 20-33 have received content object 340 via the plurality of connections 316. While the number of connections is neither overwhelming nor inadequate, a late joining node 20-30 joins the network 300 after neighbors have been picked, and initiates outgoing connections 316'-1 . . . 316'-3. However, since nodes 20-31 . . . 20-33 already have adequate neighbor connectivity to the network 300 via connections 316, none of these nodes initiate an outgoing connection to late coming node 20-30 that would allow propagation of the content object 340. The late joiner 20-30 will not receive forwarded data, as no node has picked it as a CCN neighbor. CCN logic which limits connections to avoid an "overconnected" network may not form a connection to a latecomer because the available nodes see the network as already saturated with connections.

Figure 4:
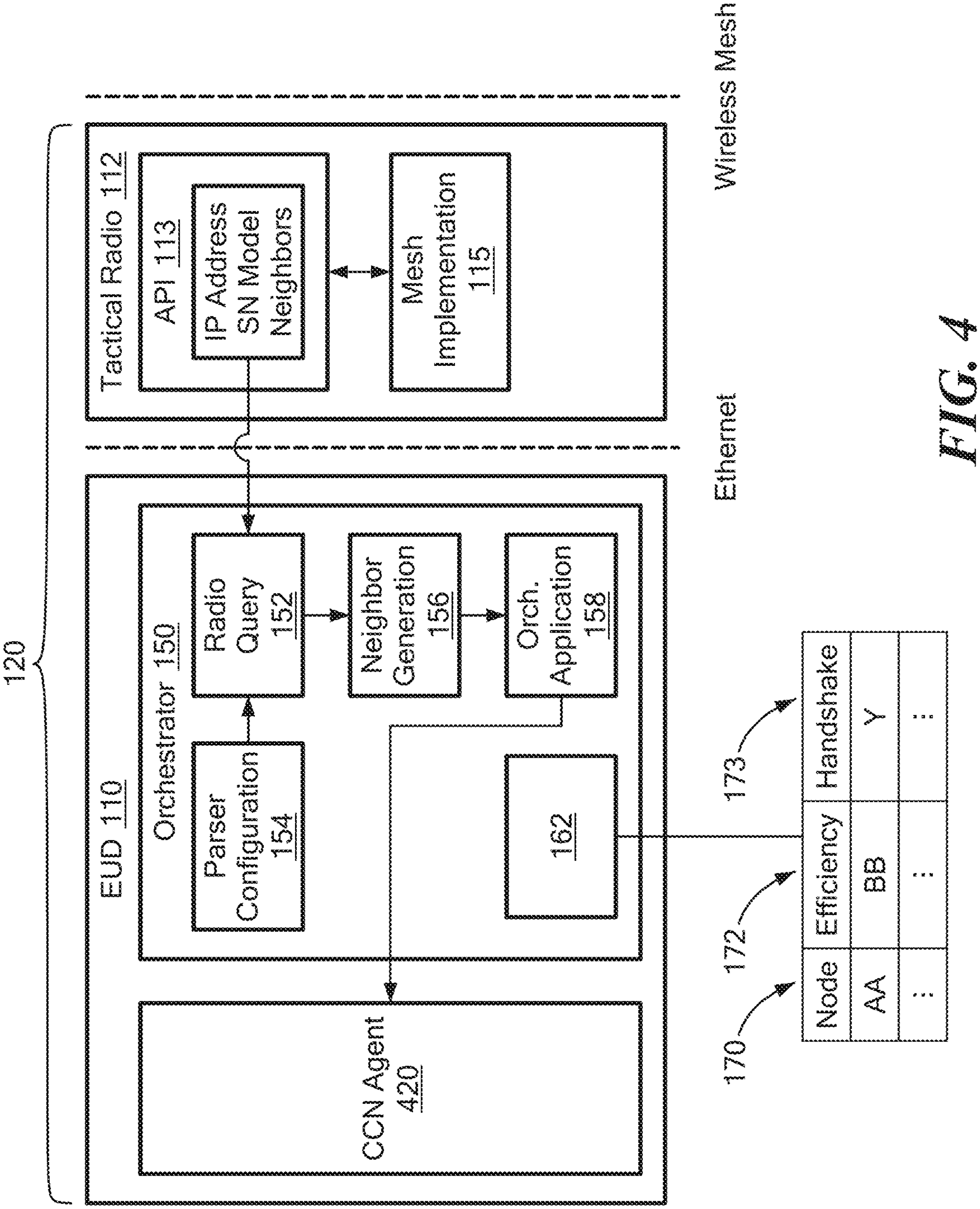
FIG. 4 shows an example node consisting of a user device executing a content centric networking agent and a network overlay orchestrator and an external mesh radio attached to the user device via Ethernet.

FIG. 4 extends the example of FIG. 3 and shows a component level view of an example node in the described mesh network. Referring to FIG. 4, an end user device 110 executes a content centric networking agent 420 and a network overlay orchestrator 150, and an external mesh radio 112 attached to the user device via a local wired connection such as Ethernet. The network overlay orchestrator 150, discussed further below, launches a network overlay orchestration application 158 (orchestration application) for selecting and establishing connections, and includes connection logic driving overlay connection management for directing stochastic replacement of channels, as discussed further below. Referring to FIGS. 1 and 4, each node 120 includes a EUD 110 having a CCN agent 420 coupled to a network overlay orchestrator 150. In the network overlay orchestrator 150, a parser configuration 154 generates a radio query 152 to receive information from the radio 112 regarding other proximate radios 112'. A radio API 113 communicates radio specific information such as IP/network addresses, radio model/vendor and detected neighbor radios via a mesh implementation 115 that communicates the radio signals 116 between radios in the network 100. The radio query 152 results in neighbor generation 156 that denotes the nearest neighbor graph 162 of other nodes 120-N for attempting connections with. Also identified are information on other visible nodes and whether they are accepting additional connection requests.

The CCN agent 420 as defined herein may take several forms of implementation based on the configurations defined in the claims. An example implementation follows, however alternate configurations may implement these functions and structures by other approaches.

In an example configuration of FIG. 4, the network overlay orchestration application 158 in the network overlay orchestrator 150 establishes connections to the other nodes 120'. The network overlay orchestrator 150 operates autonomously in each node 120 and directs the CCN agent 420 to establish, maintain and remove the connections. Generally, each CCN agent 420 establishes unidirectional outgoing connections for transmission to a distal node 120'. A reciprocal incoming connection may occur, but that is determined by the remote agent based on the neighbor radios it has access to.

The network overlay orchestrator 150 operates generally to attempt to detect when the connected nodes in the nearest neighbor graph have become stale. Through periodic polling or the use of network advertisements, e.g. multicast or broadcast packets sent by each node and received by all nodes currently connected to the network, connections are evaluated and updated. If connections remain past a predetermined interval or duration, the orchestration application 158 removes at least one of the current connections, and adds a connection to another node 120' by a perturbation operation for avoiding a passive dormancy of nodes which are either too distant for efficient communication or seldom active for information transmission.

The orchestration application 158 may use several tables. The orchestration application 158 generates the nearest neighbor graph as a table 162 indicative of current connections to proximate nodes 120' in the mesh network 100. Each neighbor node is recorded with a creation time and a predetermined validity period, which indicates when a neighbor should expire and be removed from the graph if the mesh radio does not again report the presence of that neighbor. The neighbor table 162 has fields for at least current connections to other nodes 170, and also an efficiency metric 172 denoting the relative strength of the connection. A handshake field 173 may also record a successful or unsuccessful handshake for denoting subsequent deletion. The efficiency metric and handshake completion are indicative of whether to remove the connection to the respective node. Available nodes may also be identified by other nodes (radios 112) which are within range or at least detectable by the radio 112. There may be several nodes within range or visibility, and generally the strongest connections (typically 3) are maintained, however a sparse or crowded network may have varying number of other nodes 120 in proximity.

The connection strength is based on an efficiency metric which generally denotes the strongest signal but may take several forms depending on the vendor and model of the particular radio 112. The efficiency metric 172 may be based on a geographic distance, a number of network hops, a signal strength, a signal-to-noise ratio, or other relevant factors for assessing a network burden related to transmission. From these factors, the efficiency metric is generated by assessing a network transmission burden for transmitting information to the respective node.

Figure 5:
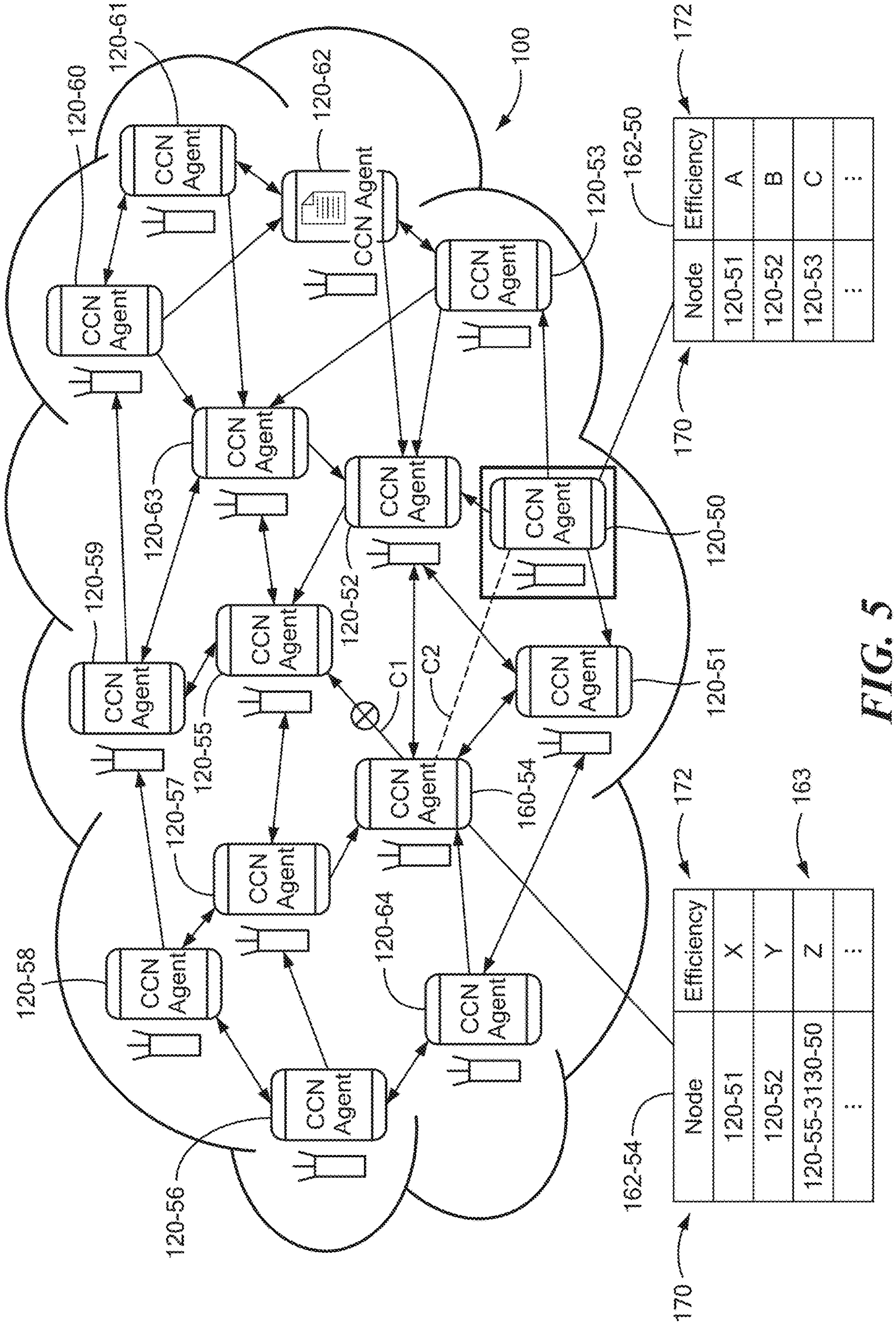
FIG. 5 shows a CCN overlay as in FIG. 4 in a mesh network.

By deploying the nodes 120 in the mesh network 100 with a CCN agent 420 and network overlay orchestration application 158, each of the deployed nodes 120 will manage their connections with stochastic replacement of nodes, as now described with respect to FIG. 5.

FIG. 5 shows a CCN overlay as discussed in FIG. 4 operating in the mesh network 100. Referring to FIGS. 1, 4 and 5, FIG. 5 shows management of connections for providing data persistence combined with a controlled number of connections per node to limit overhead. FIG. 5 depicts the mesh network 100 with each of the nodes 120 only maintaining connections to three nearest neighbors. The approach commences by identifying a set of nodes 120 arranged in a mesh network 100 supported by a mobile ad-hoc network (MANET) transport mechanism. Each node 120 launches a content centric network (CCN) agent 420 and associated network overlay orchestration application 158 on each node in the set of nodes, such that the network overlay orchestration application is configured for validating, removing and replacing connections between the set of nodes 120-N.

It follows that each of the nodes 120 are connected to one another in a MANET. This MANET could be formed based on a set of external mesh radios, with each of the devices connected to one or more mesh radios, or the MANET could be formed using the wireless connectivity provided by the devices themselves (e.g., 802.11).

All nodes 120 use the same connection logic encapsulated in the network overlay orchestration application 158, typically as a software module, though the application 158 may be configured differently depending on the type and vendor of the underlying mesh radios. On startup, the network overlay orchestration application158 establishes a connection to the attached mesh radio 112. Again, this radio may be integrated into the host platform or physically connected via an external cable. Upon establishment of this connection, the network overlay orchestration application 158 issues a subscription with the mesh radio 112 for its current network state, including its connectivity status, the list of nodes in the network within direct communication, and any additional pertinent information relevant to the current throughput of the network. This subscription can be implemented as a periodic polling for the node's state or as a series of notifications pushed by the mesh radio when elements in its state are updated.

The network overlay orchestration application 158 uses the information provided by the mesh radio 112 to establish and maintain an overlay network that resides atop the mesh network by obtaining these lists of nodes with which it has connectivity and a set of associated efficiency metrics to these nodes, stochastically selecting a set of these nodes for point-to-point CCN connections, and periodically updating these connections as the set of nodes and/or their efficiency metrics change. The network overlay orchestrator 150 triggers updates to the overlay network based on time-based or event-based thresholds, such as a fixed amount of time or after N changes in neighbors, e.g., if the mesh events are pushed by the radio and aggregated by the network overlay orchestrator 150. This periodic updating ensures that the overlay network utilizes a timely representation of the underlying mesh topology.

In order to establish and maintain the overlay network, the network overlay orchestration application 158 periodically executes a method to remove, refresh, and add nodes to the overlay network. At the start of each execution, detailed below in FIG. 6, the network overlay orchestration application 158 queries the attached mesh radio 112 for a snapshot of connected nodes 120 and their efficiency metrics. The network overlay orchestration application 158 removes any existing CCN connections associated with nodes that are no longer efficiently connected, then validates existing CCN connections by executing a connection handshake to verify the identity of the remote node and that the remote node is capable of receiving additional connections. This handshake may be actively performed, such as by sending an announcement or authentication message to the remote node and receiving a response, or passively performed, such as by utilizing a lookup table to determine that remote node has recently sent a network advertisement confirming its identity and ability to receive. In the passive case, the network advertisement may take the form of a multicast or broadcast packet sent throughout the mesh network and received by the application on each participating node. If the handshake is not completed successfully, the module will also remove this connection. If all existing CCN connections successfully complete the handshake, the application would otherwise not add any additional connections due to the predetermined maximum number of connections having been reached. However, if the application has determined that at least one other viable node for connection is present on the mesh network, the application will stochastically remove a connection in order to introduce perturbation into the neighbor graph. Perturbation is a feature to interrupt a potentially static equilibrium and is used to prevent orphaned nodes (a node which no other node has a CCN connection to) in stable environments. If the network overlay orchestration application 158 determines, based on its configuration and information from the mesh radio regarding the number of connected nodes, that additional CCN connections are desirable and supported by the current MANET topology, it will stochastically select additional nodes up to a configured maximum and perform a connection handshake as described above. If this handshake is successful, a CCN connection will be created to each of these nodes.

Performance and mesh network health are promoted by limiting CCN connections to nodes that have a beneficial efficiency metric, e.g., either directly connected or within a small number of hops in the mesh. This improves the bandwidth efficiency of the MANET by ensuring network traffic travels over the fewest number of hops between the radios 112.

Continuing to refer to FIG. 5, a newly introduced node 120-50 (shown as boxed) enters the mesh network 100 of connected nodes 120-51 . . . 120-64. New node 120-50 accumulates a neighbor table 162-50 of three nodes, however no other nodes pick up the node 120-50 (recall that the neighbor table lists outgoing connections, and these connections need not be reciprocated by the destination node). If sufficient changes to node efficiency (i.e. network distance) do not occur, no other nodes might seek out a new connection to node 120-50. However, according to configurations herein, even when a node joins the mesh as a "latecomer," after some amount of time or an event, each node will remove one of its CCN connections and stochastically select a new node to connect to, ensuring no nodes are orphaned from data forwarding.

For example, node 162-54 has a neighbor graph 162-54, including three proximate nodes. Upon a stochastic interval, node 120-54 removes connection C1 to node 120-55, and replaces it with connection C2 to newly added node 120-50, as shown by entry 163.

Figure 6:
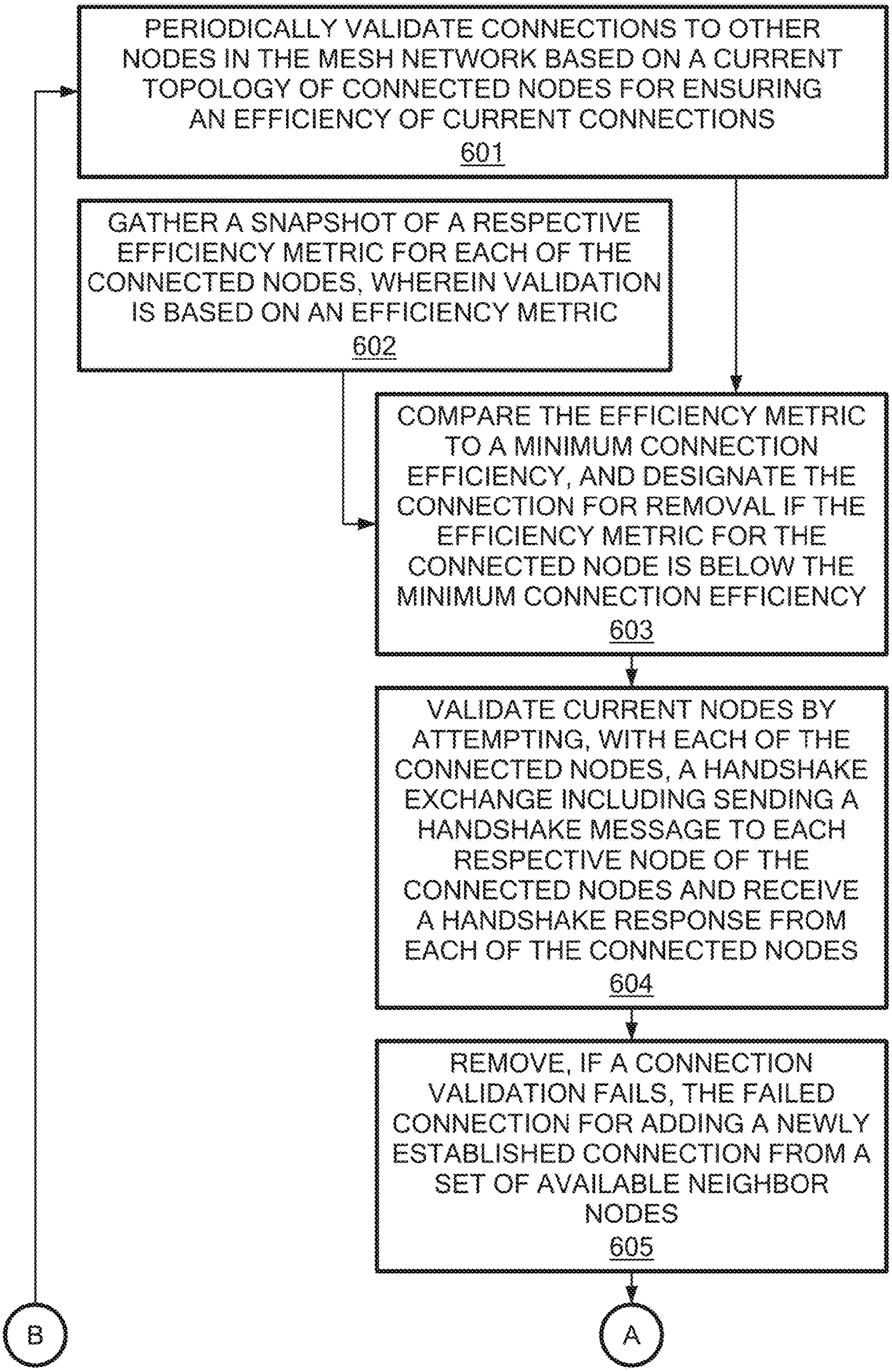
FIG. 6 shows a flowchart detailing the execution logic of the network overlay orchestration application.
Figure 6:
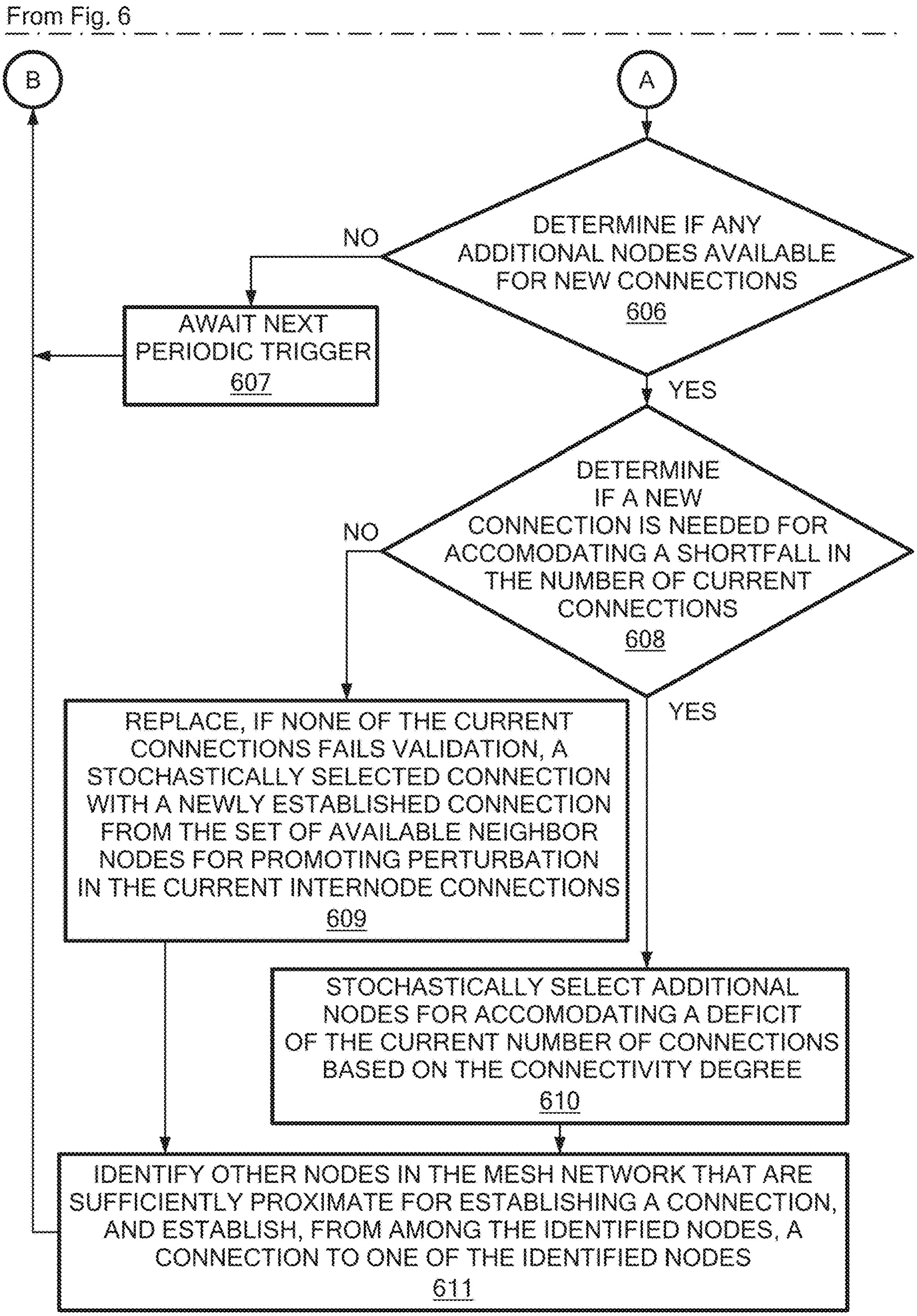

FIG. 6 shows a flowchart detailing the execution of the orchestration application 158 for overlay management using the network overlay orchestrator 150 as in FIG. 4 on the network of FIG. 5. Referring to FIGS. 4-6, in the mesh network 100 of interconnected wireless nodes, each node 120 is autonomously operable for a wireless connection C(n) to one or more of other wireless nodes for transporting content. A method for stochastically refreshing and maintaining internode connections in the wireless mesh network includes, at step 601 periodically validating connections to other nodes 120 in the mesh network 100 based on a current topology of connected nodes for ensuring an efficiency of current connections. This generally means traversing the neighbor table 162 for current connections.

Connection viability is based on the efficiency metric 172, and the network overlay orchestration application 158 gathers a snapshot of a respective efficiency metric for each of the connected nodes in the table 162, as depicted at step 602. This may be obtained from a query of the radio 112.

The network overlay orchestration application 158 then validates each connection of the connections to other nodes 120 by verifying that the efficiency metric 172 for each node 120 of the connected nodes 170 has a sufficient value based on a minimum connection efficiency. This involves comparing the efficiency metric to a minimum connection efficiency as described above, and designating the connection for removal if the efficiency metric for the connected node is below the minimum connection efficiency, as disclosed at step 603. In other words, each connection is analyzed for nonperformance based on a network distance, and a connection that is too weak or noisy, for example, is removed.

For the connections that pass the test of connection efficiency, the network overlay orchestration application 158 attempts, with each of the connected nodes, a handshake exchange to ensure a valid connection. In a mesh network of mobile nodes and radios, nodes connect and disconnect in an unpredictable manner due to changes in physical distance, interference, or other factors. As a result, periodic affirmative confirmation is needed that a node is still present within the mesh network and able to receive connections. This handshake may also include authentication data used to validate that the node is permitted to participate in the overlay network. This handshake may be actively performed, in which case the network overlay orchestration application 158 sends a handshake message to each respective node of the connected nodes from the neighbor graph (table) 162, as disclosed at step 604. Valid nodes still able to communicate will transmit a handshake response and complete the handshake exchange. This handshake may also be passively performed, such as by the network overlay orchestration application 158 receiving network advertisements from other connected nodes confirming their identity and ability to receive. The network advertisement may take the form of a multicast or broadcast packet sent throughout the mesh network and received by the application on each participating node. The handshake exchange is completed when both sides of a connection have received a network advertisement from their respective remote node within a predetermined validity period.

The network overlay orchestration application 158 replaces any failed connection with a newly established connection from a set of available neighbor nodes. The network overlay orchestration application 158 identifies a connection for deletion if it fails either the handshake or efficiency metric test, as shown at step 605.

A check is performed, at step 606, to identify if additional connections are available. A current topology of connected nodes is based on a connectivity degree of a predetermined number of nodes, and a newly established connection may be needed for accommodating a shortfall in the number of current connections. In the example arrangement, the connectivity degree is 3, meaning that each node strives for 3 entries in its neighbor table 162. If no additional nodes 120 are available, the network overlay orchestration application 158 awaits the next validation interval, as disclosed at step 607. The validation iterates according to a periodic or event driven interval. Any suitable interval may be used, depending generally on a density and mobility of nodes. In a particular configuration, the interval may be around 15 seconds.

Since the topology of connected nodes is based on a connectivity degree of a predetermined number of nodes (3 in the example shown), a further check is performed at step 608 to identify if there were no nodes deleted at step 605 that leave vacancies exist in the neighbor table 162. If no nodes were deleted from a validation failure, then the network overlay orchestration application 158 replaces a stochastically selected connection with a newly established connection from the set of available neighbor nodes to introduce perturbation in the current internode connections, as disclosed at step 609. Otherwise the network overlay orchestration application 158 need not delete any entries and stochastically selects additional nodes for accommodating a deficit of the current number of connections based on the connectivity degree, as shown at step 610.

The selection of a new node if no nodes triggered a deletion provides the network perturbation and stochastic selection that acknowledges new nodes in the mesh network 100 and ensures none are orphaned or abandoned simply because the incumbent nodes have satisfactory connections. New nodes are added by identifying other nodes 120 in the mesh network 100 that are sufficiently proximate for establishing a connection to, as depicted at step 611, and the network overlay orchestration application 158 establishes, from among the identified nodes, a connection to one of the identified nodes.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a mesh network of interconnected wireless nodes, each node independently managing a wireless connection to one or more of a set of available neighbor nodes for transporting informational content, a method for stochastically refreshing and maintaining internode connections in a mesh network, comprising:

periodically validating connections to other nodes in the mesh network by comparing an efficiency metric for each respective connection for meeting a sufficient value;

if the efficiency metric for the respective connection is below a minimum connection efficiency, designating the connection for removal, and if not, replacing a stochastically selected current connection with a newly established connection from the set of available neighbor nodes by:

removing at least one of the current connections; and adding a connection to another node by a perturbation operation.

2. The method of claim 1 further comprising, prior to replacing a stochastically selected current connection, detecting when one or more of the current connections have become stale.

3. The method of claim 1 wherein the efficiency metric detects and avoids a passive dormancy of nodes which are either too distant for efficient communication or seldom active for information transmission.

4. The method of claim 1 wherein validating each connection of one or more connections to other nodes further comprises:

verifying that the efficiency metric for each connection corresponds to a sufficient value based on a minimum connection efficiency; and completing a handshake exchange with each node of the connected nodes.

5. The method of claim 1 wherein a current topology of connected nodes of a plurality the nodes is based on a connectivity degree of a predetermined number of nodes, and the newly established connection is for accommodating a detected shortfall in the number of current connections.

6. The method of claim 1 wherein validation based on the efficiency metric further comprises:

gathering a snapshot of a respective efficiency metric for each of the connected nodes.

7. The method of claim 1 wherein validation is based on a handshake exchange, further comprising:

attempting, with each of the connected nodes, a handshake exchange by:

sending a handshake message to each respective node of the connected nodes; and receiving a handshake response from each respective node, or designating the connection to the respective node from which a handshake response was not received for removal.

8. The method of claim 1 wherein validating connections further comprises at least one of evaluation of connection efficiency or a handshake exchange, further comprising:

comparing a connection efficiency to a minimum connection efficiency, or establishing a handshake over each respective connection, each connected node sending a network advertisement throughout the mesh network, the handshake exchange deemed completed when any pair of connected nodes have each received a network advertisement from the other within a designated period.

9. The method of claim 2 wherein adding or replacing nodes further comprises:

identifying a connection for deletion;

identifying other nodes in the mesh network that are sufficiently proximate for establishing a connection to; and establishing, from among the identified nodes, a connection to one of the identified nodes.

10. The method of claim 1 further comprising computing the efficiency metric by receiving at least one of a geographic distance, a number of hops, a signal strength and a signal-to-noise ratio; and generating the efficiency metric by assessing a network transmission burden for transmitting information to the respective node.

11. The method of claim 1 further comprising:

generating a nearest neighbor graph indicative of the current connections to proximate nodes of the other nodes in the mesh network; and storing, for each proximate node in the nearest neighbor graph, an entry for storing a corresponding efficiency metric and a handshake completion, the efficiency metric and handshake completion indicative of whether to remove the proximate connection to the respective node.

12. The method of claim 1 further comprising stochastically selecting additional nodes for accommodating a deficit of the current number of connections based on the connectivity degree.

13. The method of claim 1 further comprising:

identifying the set of nodes arranged in the mesh network supported by a mobile ad-hoc network (MANET) transport mechanism; and launching a content centric network (CCN) agent on each node in the set of nodes, the CCN agent configured for validating, removing and replacing connections between the set of nodes.

14. A mesh network management device, comprising:

an end user device operable for network communication over a wireless mesh network;

a radio coupled to the end user device for establishing wireless connections to other radios in the wireless mesh network, the radio and the end user device defining a node of a plurality of nodes in the wireless mesh network;

a connection agent in communication with a network overlay orchestration application for periodically validating connections to other nodes of the plurality of nodes in the mesh network by comparing an efficiency metric for each respective connection for meeting a sufficient value, the network overlay orchestration application in communication with the radio having logic responsive to the connection agent for:

if the efficiency metric for the respective connection is below a minimum connection efficiency, designating the connection for removal, and if not, detecting when one or more of the current connections have become stale, and if so, replacing a stochastically selected current connection by:

removing at least one of the current connections; and adding a connection to another node by a perturbation operation.

15. The mesh network management device of claim 14 wherein validating each connections of the connections to other nodes further comprises:

verifying that the efficiency metric for each node of the connected nodes has a sufficient value based the minimum connection efficiency; and completing a handshake exchange with each node of the connected nodes.

16. The mesh network management device of claim 14 wherein a current topology of connected nodes is based on a connectivity degree of a predetermined number of nodes, and the newly established connection is for accommodating a shortfall in the number of current connections.

17. The mesh network management device of claim 14 further comprising:

a nearest neighbor table indicative of current connections to proximate nodes of the other nodes in the mesh network; and for each proximate node in the nearest neighbor table, an entry for storing a corresponding efficiency metric and a handshake completion, the efficiency metric and handshake completion indicative of whether to remove the connection to the respective proximate node.

18. The mesh network management device of claim 17 wherein the connection logic is configured to detect when the connected nodes in the nearest neighbor graph have become stale;

remove at least one of the current connections; and add a connection to another node by a perturbation operation for avoiding a passive dormancy of nodes which are either too distant for efficient communication or seldom active for information transmission.

19. The mesh network management device of claim 14 further comprising:

a loader configured to identify a set of nodes arranged in a mesh network supported by a mobile ad-hoc network (MANET) transport mechanism, the loader configured to launch a content centric network (CCN) agent on each node in the set of nodes, the CCN agent configured for validating, removing and replacing connections between the set of nodes.

20. A computer program embodying program code on a non-transitory medium that, when executed by a processor, performs steps for implementing, in a mesh network of interconnected wireless nodes, a system such that each node independently manages a wireless connection to one or more of other wireless nodes for transporting informational content, a method comprising:

periodically validating connections to other nodes in the mesh network by comparing an efficiency metric for each respective connection for meeting a sufficient value;

if the efficiency metric for the respective connection is below a minimum connection efficiency, designating the connection for removal, and if not, replacing a stochastically selected current connection with a newly established connection from the set of available neighbor nodes by:

removing at least one of the current connections; and adding a connection to another node by a perturbation operation.

* * * * *